US010459440B2

(12) United States Patent
Rust et al.

(10) Patent No.: US 10,459,440 B2
(45) Date of Patent: Oct. 29, 2019

(54) SYSTEM AND METHOD FOR REMOTELY ASSISTING AUTONOMOUS VEHICLE OPERATION

(71) Applicant: GM GLOBAL TECHNOLOGY OPERATIONS LLC, Detroit, MI (US)

(72) Inventors: Ian Rust, San Francisco, CA (US); Kyle Vogt, San Francisco, CA (US); Solomon Bier, San Francisco, CA (US); Drew Allyn Gross, San Francisco, CA (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 152 days.

(21) Appl. No.: 15/398,562

(22) Filed: Jan. 4, 2017

(65) Prior Publication Data

US 2017/0192423 A1 Jul. 6, 2017

Related U.S. Application Data

(60) Provisional application No. 62/274,577, filed on Jan. 4, 2016, provisional application No. 62/274,586, filed
(Continued)

(51) Int. Cl.
*G05D 1/00* (2006.01)
*G01C 21/34* (2006.01)
(Continued)

(52) U.S. Cl.
CPC ........... *G05D 1/0038* (2013.01); *G01C 21/28* (2013.01); *G01C 21/3438* (2013.01);
(Continued)

(58) Field of Classification Search
CPC .. G05D 1/0038; G05D 1/0212; G05D 1/0016; G05D 1/0077; G05D 1/0238; G05D 1/0257; G05D 1/0278; G05D 1/0287; G05D 1/0088; G05D 1/0027; G05D 1/0246; G05D 2201/0213; G01C 21/28; G01C 21/3461;
(Continued)

(56) References Cited

U.S. PATENT DOCUMENTS 9,008,890 B1 *   4/2015   Herbach ............... B60W 30/00
                                                          701/26
9,201,421 B1    12/2015   Fairfield et al.
(Continued)

OTHER PUBLICATIONS

U.S. Appl. No. 15/398,577; NonFinal Office Action—dated Dec. 5, 2018.
(Continued)

*Primary Examiner* — Muhammad Shafi
(74) *Attorney, Agent, or Firm* — Lorenz & Kopf, LLP

(57) ABSTRACT

Systems and methods are provided for remotely assisting an autonomous vehicle. The method includes: aggregating sensor data from the autonomous vehicle; identifying an assistance-desired scenario; generating an assistance request based on the sensor data; transmitting the assistance request to a remote assistance interface; and receiving and processing a response to the assistance request. The remote assistance interface includes a remote assistance interface that is used in generating the response to the assistance request.

21 Claims, 4 Drawing Sheets

Related U.S. Application Data on Jan. 4, 2016, provisional application No. 62/302,874, filed on Mar. 3, 2016.

(51) Int. Cl.
 *G05D 1/02* (2006.01)
 *G01C 21/28* (2006.01)
 *G07C 5/00* (2006.01)

(52) U.S. Cl.
 CPC ..... *G01C 21/3461* (2013.01); *G01C 21/3492* (2013.01); *G05D 1/0016* (2013.01); *G05D 1/0027* (2013.01); *G05D 1/0077* (2013.01); *G05D 1/0212* (2013.01); *G05D 1/0238* (2013.01); *G05D 1/0257* (2013.01); *G05D 1/0278* (2013.01); *G05D 1/0287* (2013.01); *G05D 2201/0213* (2013.01); *G07C 5/008* (2013.01)

(58) Field of Classification Search
 CPC . G01C 21/3438; G01C 21/3492; G07C 5/008
 USPC .......................................................... 701/2
 See application file for complete search history.

(56) References Cited

U.S. PATENT DOCUMENTS

| | | | |
|---|---|---|---|
| 2008/0095104 A1* | 4/2008 | Hansen | H04N 5/775 370/329 |
| 2013/0238892 A1* | 9/2013 | Anderson | G06F 21/73 713/154 |
| 2014/0074338 A1 | 3/2014 | Nordbruch | |
| 2015/0066284 A1 | 3/2015 | Yopp | |
| 2015/0248131 A1 | 9/2015 | Fairfield et al. | |
| 2015/0346727 A1 | 12/2015 | Ramanujam | |
| 2015/0350439 A1* | 12/2015 | Holden | H04M 3/5166 379/265.09 |
| 2015/0353033 A1 | 12/2015 | Pribisic | |
| 2016/0249180 A1 | 8/2016 | Li | |
| 2016/0334797 A1* | 11/2016 | Ross | G08G 1/20 |
| 2018/0189717 A1 | 7/2018 | Cao | |

OTHER PUBLICATIONS

U.S. Appl. No. 15/398,454; NonFinal Office Action—dated Aug. 29, 2018.
U.S. Appl. No. 15/398,552; Non-Final Office Action—dated Mar. 27, 2018.

* cited by examiner

SYSTEM AND METHOD FOR REMOTELY ASSISTING AUTONOMOUS VEHICLE OPERATION

CROSS-REFERENCE TO RELATED APPLICATIONS

This application claims the benefit of U.S. Provisional Application Ser. No. 62/274,577, filed on 4 Jan. 2016, U.S. Provisional Application Ser. No. 62/274,586, filed on 4 Jan. 2016, and U.S. Provisional Application Ser. No. 62/302,874, filed on 3 Mar. 2016, which are incorporated in their entireties by this reference. This application also incorporates by this reference U.S. patent application Ser. No. 15/398,577 named System and Method for Autonomous Vehicle Fleet Routing, filed on 4 Jan. 2017.

TECHNICAL FIELD

This invention relates generally to the vehicle automation field, and more specifically to new and useful systems and methods for remotely assisting autonomous vehicle operation.

BACKGROUND

Vehicle automation has been suggested as a means to increase vehicle safety almost as long as cars have been in existence—experiments on autonomy in cars have been conducted since at least the 1920s. Only recently, though, has computer technology advanced enough to make true vehicle automation possible.

While in many ways the artificial 'brain' of an autonomous vehicle is superior to that of a human driver, autonomous vehicles may still encounter situations in which an 'expert opinion' may enhance the decision-making process.

Thus, there is a need in the vehicle automation field to create systems and methods for remotely assisting autonomous vehicle operation. This invention provides such new and useful systems and methods.

DESCRIPTION OF THE PREFERRED EMBODIMENTS

The following description of the preferred embodiments of the invention is not intended to limit the invention to these preferred embodiments, but rather to enable any person skilled in the art to make and use this invention.

The inventions of the present application are directed to systems and methods for remotely assisting autonomous vehicle operation. These systems and methods may increase the ability of autonomous vehicles to operate safely on the road, resulting in a safer driving experience not just for system adopters, but for drivers everywhere.

1. System for Remotely Assisting Autonomous Vehicle Operation

Figure 1:
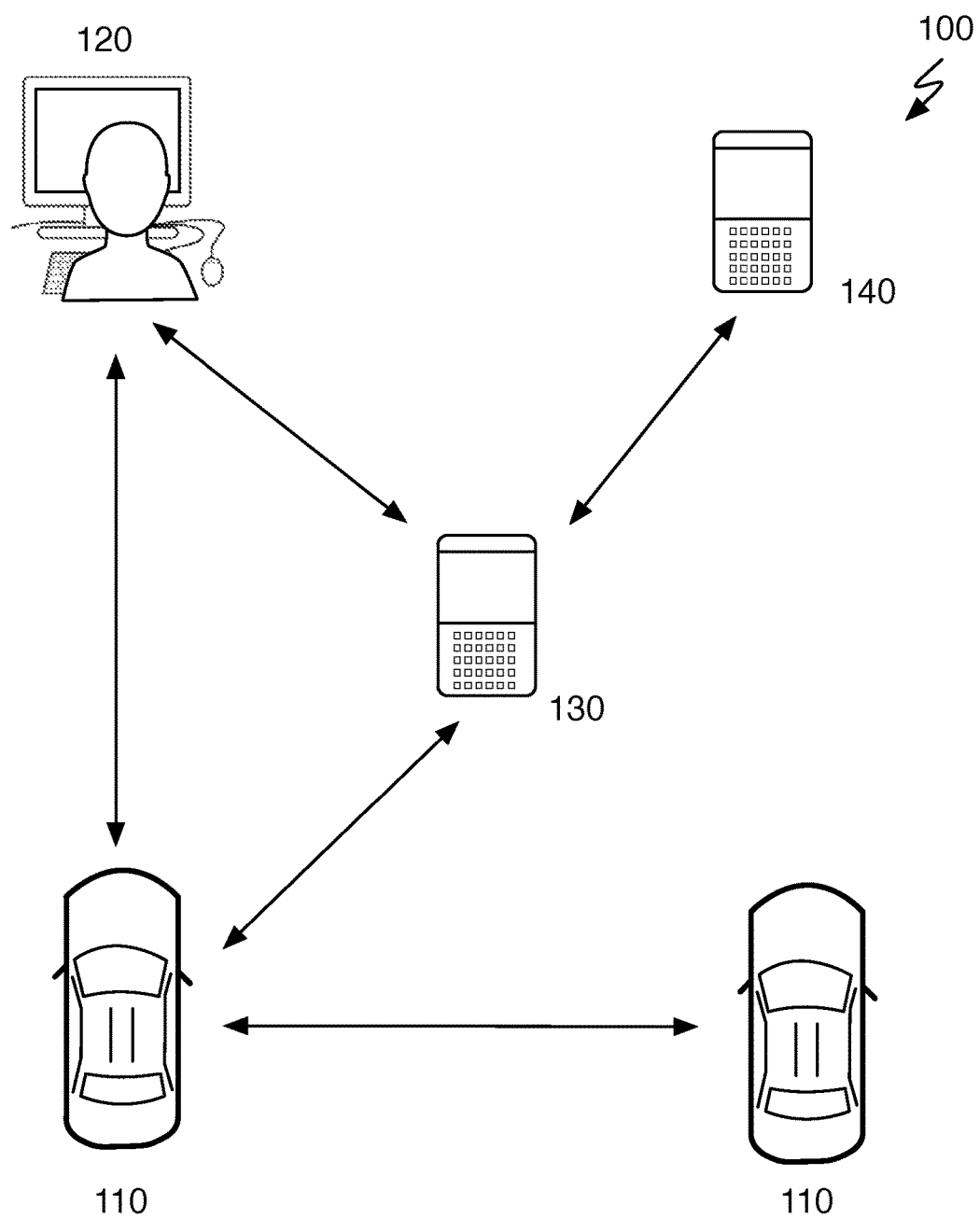
FIG. 1 is a diagram representation of a system of a preferred embodiment.

As shown in FIG. 1, a system 100 for remotely assisting autonomous vehicle operation includes an onboard computer 110 and a human expert interface 120. The system 100 may additionally include an assistance router 130 and/or an artificially intelligent (AI) expert 140.

The system 100 functions to enable remote assistance to augment the intelligence of the onboard computer no of an autonomous vehicle. While the artificial controllers of autonomous vehicles (i.e., onboard computers 110) perform better than their human driver counterparts at many tasks, there are some scenarios in which the onboard computer 110 may wish to request assistance in analyzing data or deciding for successfully negotiating the scenario(s). Traditionally, this problem has been addressed by utilizing the skills of a human driver riding in the autonomous vehicle; however, this solution requires that a human driver be present and capable of taking control of the vehicle.

The system 100 enables the onboard computer 110 to request assistance from another source; preferably, a human expert operating a human expert interface 120 at a remote computer. Additionally or alternatively, the system 100 may enable the onboard computer 110 to request assistance from another onboard computer no or an artificially-intelligent expert 140. For instance, onboard computer 110 may identify one or more additional autonomous vehicles in a close proximity. In such example, the onboard computer 110 may be able to send the assistance request to one or more of the additional autonomous vehicle including a request to access one or more cameras of the additional autonomous vehicles in order to obtain additional views of a scenario, where the additional views are not viewable by any of the onboard cameras of the autonomous vehicle making the assistance request. With the additional camera views of a scenario, the onboard computer 110 may be able to negotiate a resolution to the assistance-desired scenario without necessarily contacting the human expert interface 120 and/or the AI interface 140.

Some example scenarios in which remote assistance may be desired include scenarios in which autonomous vehicle sensing is impaired (e.g., due to sensor failure, environmental hazards, or other causes), scenarios in which autonomous vehicle operation is impaired (e.g., a flat tire, engine problems, control interface issues, onboard computer malfunction), scenarios in which autonomous vehicle decision-making confidence is low (e.g., unrecognized objects in the road, a vehicle or pedestrian behaving erratically, objects blocking a path of the autonomous vehicle), and scenarios in which interaction is otherwise desired with environment or other entities (e.g., inclement weather, a passenger or pedestrian is in need of medical assistance, a vehicle is occupied by an unauthenticated individual, an item has been left in a vehicle by a previous occupant). Remote assistance may also be requested by an occupant of the autonomous vehicle.

As another common example, an autonomous vehicle may encounter an assistance-desired scenario in which the only possible routing or path for traversing the assistance-desired scenario involves violating one or more traffic laws or violating vehicle travelling norms and general rerouting (e.g., in compliance with traffic laws) of the autonomous vehicle is not an available option. These type of assistance-desired scenarios may require that the autonomous vehicle traverse across a double yellow line and into opposing traffic possibly to avoid an accident or a double-parked vehicle or the like. However, in some embodiments, the standard control and/or operational parameters for the autonomous vehicle do not allow for the autonomous vehicle to expressly violate traffic laws and further, the autonomous vehicle may not have internal protocols sufficient to navigate across a double yellow line. In such embodiments, the remote assistance interface 140 may intervene either via request from the autonomous vehicle or automatically by the remote assistance interface 120 without a direct request from the autonomous vehicle.

In response to the assistance-desired scenario, the human expert at the remote assistance interface 120 may take control of the autonomous vehicle in order to traverse the double yellow lines remotely. Alternatively, the remote assistance interface 140 may respond to the assistance-desired scenario by drawing, generating and/or selecting a proposed route for traversing the assistance-desired scenario and transmitting the proposed route to the autonomous vehicle for implementation and/or execution. For instance, the remote assistance interface may re-draw existing boundary lines, such as traffic lines that define a road or travel lane, using a computer interface, such as a touch-sensitive display. In such example, a human expert at the remote assistance interface may use an input tool, such as a drawing pen or their finger, to draw new boundary lines or a new travel lane onto a display showing an actual view of the circumstances around the autonomous vehicle. The re-drawn boundary lines once completed or at a time at which the new boundary lines are being drawn by the human expert at the remote assistance interface may be transmitted to be displayed at an interface of the autonomous vehicle, and preferably to be displayed at a corresponding position of a schematic showing the circumstances around the vehicle. Essentially, the human expert is able to draw new lanes for navigating an avoidance scenario on her interface and at the same time or contemporaneous with the drawing by the human expert, the new travel lanes will appear on the interface of the autonomous vehicle. Additionally or alternatively, by drawing the new route by the human expert, remote assistance interface may automatically generate autonomous vehicle control data that will be transmitted to the autonomous vehicle along with or separate from the drawing. The autonomous vehicle control data will preferably include computer instructions, that when executed by the autonomous vehicle, enables the autonomous vehicle to travel along the redrawn boundary lines.

Another assistance-desired scenario may include when the roads are repainted and/or construction in which the autonomous vehicle must drive the wrong direction or path and in another lane, as described similarly above. These types of scenarios may give rise to circumstances in which a two-way road becomes a bi-directional one way shared road that may include traffic signal controllers (e.g., human traffic guidance) and the like. The remote assistance interface 140 may similarly intervene to provide one or more routing options to the autonomous vehicle, including generally rerouting and/or rerouting using redrawn boundary lines to assist the autonomous vehicle in negotiating the scenario.

The system 100 may route assistance requests or assistance to autonomous vehicles using the assistance router 130, but may alternatively route requests in any manner.

The onboard computer no functions to control an autonomous vehicle. The onboard computer no is preferably coupled to a sensor suite (e.g., computer vision system, LIDAR, wheel speed sensors, GPS, etc.) and processes sensed data from the sensor suite and/or other sensors in order to determine the state of the autonomous vehicle; and, based upon the vehicle state and programmed instructions, the onboard computer 110 preferably modifies or controls behavior of the autonomous vehicle.

The autonomous vehicle is preferably a fully autonomous automobile, but may additionally or alternatively be any semi-autonomous or fully autonomous vehicle; e.g., a boat, an unmanned aerial vehicle, a driverless car, drone, etc.

The onboard computer 110 is preferably a general-purpose computer adapted for I/O communication with vehicle control systems and sensor systems, but may additionally or alternatively be any suitable computing device.

The onboard computer 110 is preferably connected to the Internet via a wireless connection (e.g., via a cellular data connection). Additionally or alternatively, the onboard computer 110 may be coupled to a number of wireless or wired communication systems. For example, the onboard computer 110 of one vehicle may communicate with the onboard computers no of other vehicles over Bluetooth, short-range communication schemes (e.g., radio), and/or long-range communication schemes other than the Internet.

Figure 2:
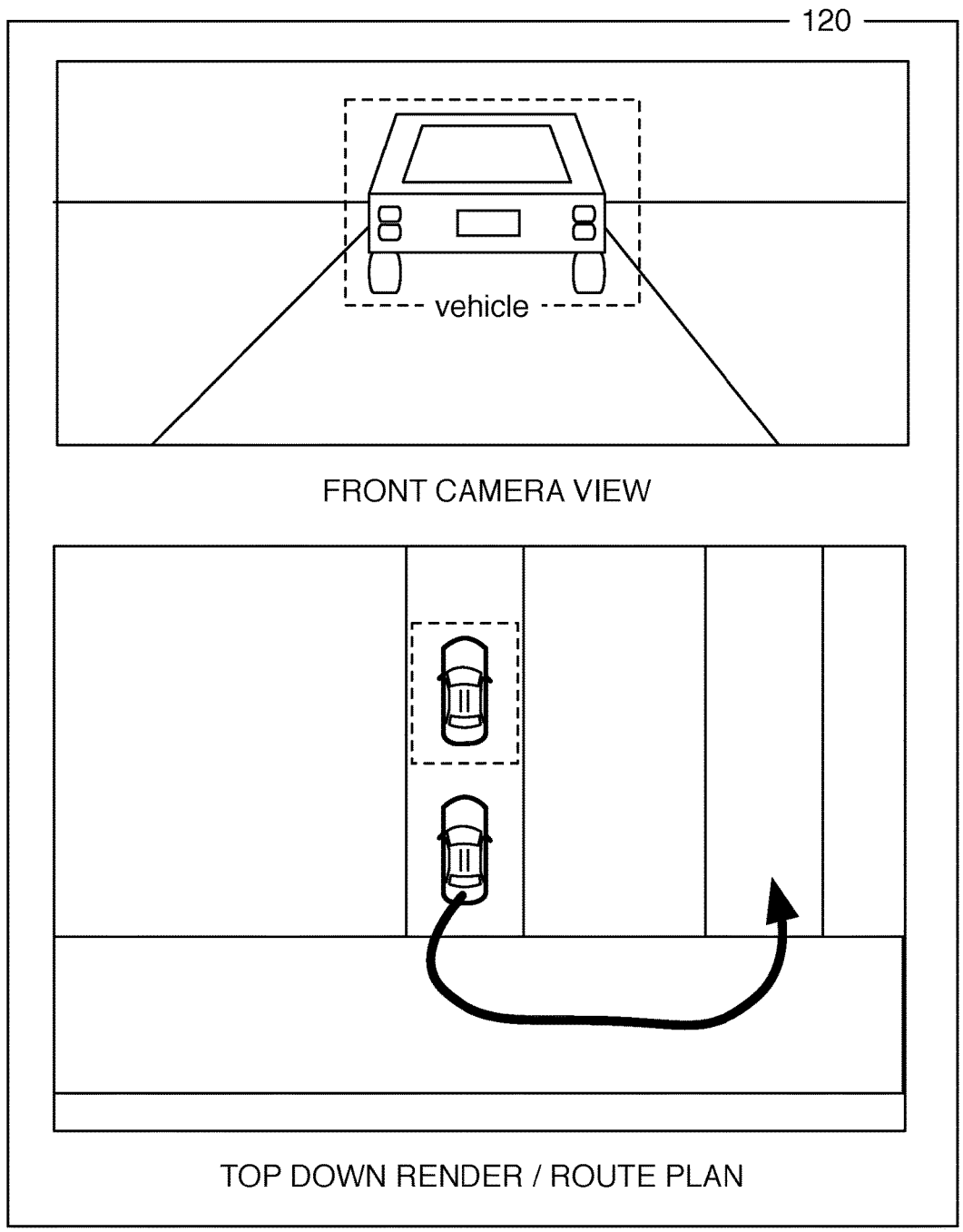
FIG. 2 is an example view representation of a human expert interface of a system of a preferred embodiment.

As shown in FIG. 2, the human expert interface 120 functions to allow a human to view, assess, and respond to remote assistance requests originating at the onboard computer no. The human expert interface 120 preferably enables a human expert to view assistance data (e.g., transmitted as part of an assistance request) and create or select responses based on the assistance data.

Assistance data may include raw sensor data (e.g., the view of a camera of the autonomous vehicle), processed sensor data (e.g., a camera view overlaid with object identification indicators placed by the autonomous vehicle's on-board computer, predicted vehicle trajectory), autonomous vehicle analysis (e.g., a text description, generated by the autonomous vehicle, of a scene imaged by a machine vision system), historical behavior of the autonomous vehicle, planned future (or proposed) behavior of the autonomous vehicle, autonomous vehicle state, environment state, communication data from another entity (e.g., occupants of the vehicle, pedestrians, authorities, an internal or external entity that has accessed the vehicle, users of a driverless vehicle service etc.), or any other data.

The human expert interface 120 preferably includes one or more output means, such as display means (e.g., a screen, a touch-sensitive display panel or screen, any known display, etc.) as well an input means (e.g., keyboard and mouse, steering wheel and pedals, tablet, microphone, any known input device, etc.) and processing means to assist in evaluating an assistance request for responding to assistance requests or an opportunity to provide remote assistance to an autonomous vehicle.

The assistance router 130 functions to route assistance requests generated at an onboard computer 110 to an assistor (e.g., another onboard computer 110, a human expert interface 120, and/or an AI expert 140). For example, the assistance router 130 may select a human expert from a list of available experts to provide assistance the autonomous vehicle, or may determine whether an assistance request should be routed to a human expert interface 120 or to an AI expert 140.

The assistance router 130 may additionally or alternatively partition assistance requests (e.g., request part of a response from a human expert interface 120 and another part from an AI expert 140) or send them to multiple destinations at once (e.g., send an assistance request to several human expert interfaces 120).

The assistance router 130 may likewise route assistance request responses; for example, the assistance router 130 may broadcast a generalized response (described in sections on the method 200) to a number of vehicles in an area. The assistance router 130 may additionally or alternatively perform assistance request response processing. Response processing may include combining, selecting, fusing, prioritizing, or processing multiple proposed assistance request responses (or response components) in any manner. For example, the assistance router 130 may use a voting or weighting system to select and/or combine assistance request responses before routing them to a vehicle (or group of vehicles). Additionally, the assistance router may analyze the assistance data of the assistance request to identify a subject to which the assistance request may be related. The assistance router 130 in such case may compare parts of the assistance data to a predetermined list or otherwise, extract elements from the assistance data to generate a subject to which the assistance request is most closely related. By identifying a subject of the assistance request, the assistance router 130 can more efficiently route the assistance request to an appropriate assistor.

In prioritizing multiple assistance request, once the assistance router 130 identifies a subject of each of the assistance requests or if each of the assistance requests were previously tagged with identifying information, the assistance router 130 may compare the identified or tagged subject of each assistance request to a predetermined prioritization list which enables the assistance router 130 to rank each of the multiple assistance requests in order of priority or importance. For instance, scenarios involving a pedestrian may be ranked higher on the list than scenarios involving stationary objects with no human passengers or pedestrians involved.

The assistance router 130 is preferably a general-purpose computer, but may additionally or alternatively be any suitable electronic device capable of routing assistance requests. The assistance router 130 may additionally include a communication interface or communication circuits that the assistance router 130 can use to communicate and/or interface with any other computers, systems, external communication interfaces, and the like. In this way, the assistance router 130 may use the communication interface to route the assistance request to the identified recipients. The assistance router 130 may also form part of the onboard computer 110 such that it uses part of the circuitry and processing capabilities of the onboard computer no to identify routing for an assistance request.

The artificially-intelligent (AI) expert 140 functions to provide automated assistance request responses. The AI expert 140 preferably is able to leverage substantially greater computing power and/or resources (e.g., databases, data from other vehicles, etc.) than the onboard computer 110, which enables the AI expert 140 to potentially provide better solutions in shorter timeframes than would be possible with the onboard computer 110. Additionally, and/or alternatively, the AI expert 140 can provide partial solutions or solutions that may be used to augment a solution from the onboard computing device no and/or the human expert interface 120 to thereby provide a mixed solution to an assistance request.

The AI Expert 140 is preferably operable on a distributed computing system, but may additionally or alternatively operate on any suitable computing system.

Note that assistance request responses may be generated using any combination of human expert interface 120 data and AI expert 140 data. For example, the AI expert 140 may generate proposed responses that a human expert may select in the human expert interface 120.

Figure 4:
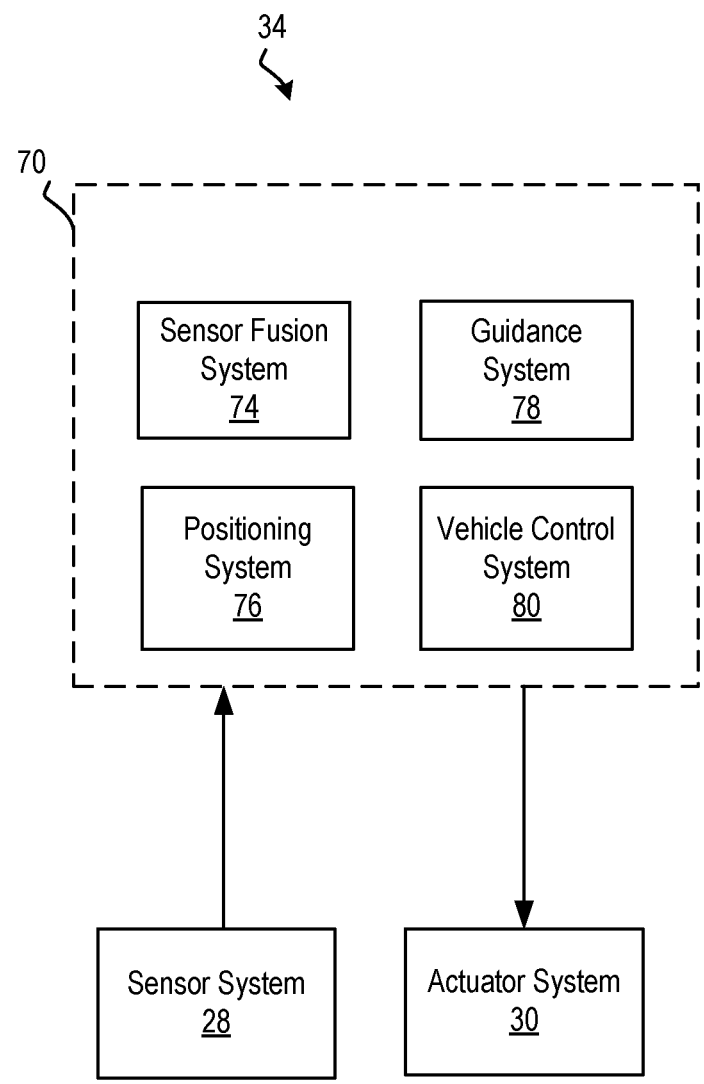
FIG. 4 is a diagram representation of a system of a preferred embodiment.

In accordance with various embodiments, controller 34 implements an autonomous driving system (ADS) 70 as shown in FIG. 4. That is, suitable software and/or hardware components of controller 34 (e.g., processor 44 and computer-readable storage device 46) are utilized to provide an autonomous driving system 70 that is used in conjunction with vehicle 110.

In various embodiments, the instructions of the autonomous driving system 70 may be organized by function or system. For example, as shown in FIG. 4, the autonomous driving system 70 can include a sensor fusion system 74, a positioning system 76, a guidance system 78, and a vehicle control system 80. As can be appreciated, in various embodiments, the instructions may be organized into any number of systems (e.g., combined, further partitioned, etc.) as the disclosure is not limited to the present examples.

In various embodiments, the sensor fusion system 74 synthesizes and processes sensor data and predicts the presence, location, classification, and/or path of objects and features of the environment of the vehicle 110. In various embodiments, the sensor fusion system 74 can incorporate information from multiple sensors, including but not limited to cameras, LIDARS, radars, and/or any number of other types of sensors.

The positioning system 76 processes sensor data along with other data to determine a position (e.g., a local position relative to a map, an exact position relative to lane of a road, vehicle heading, velocity, etc.) of the vehicle 110 relative to the environment. The guidance system 78 processes sensor data along with other data to determine a path for the vehicle 110 to follow. The vehicle control system 80 generates control signals for controlling the vehicle no according to the determined path.

In various embodiments, the controller 34 implements machine learning techniques to assist the functionality of the controller 34, such as feature detection/classification, obstruction mitigation, route traversal, mapping, sensor integration, ground-truth determination, and the like.

2. Method for Remotely Assisting Autonomous Vehicle Operation

Figure 3:
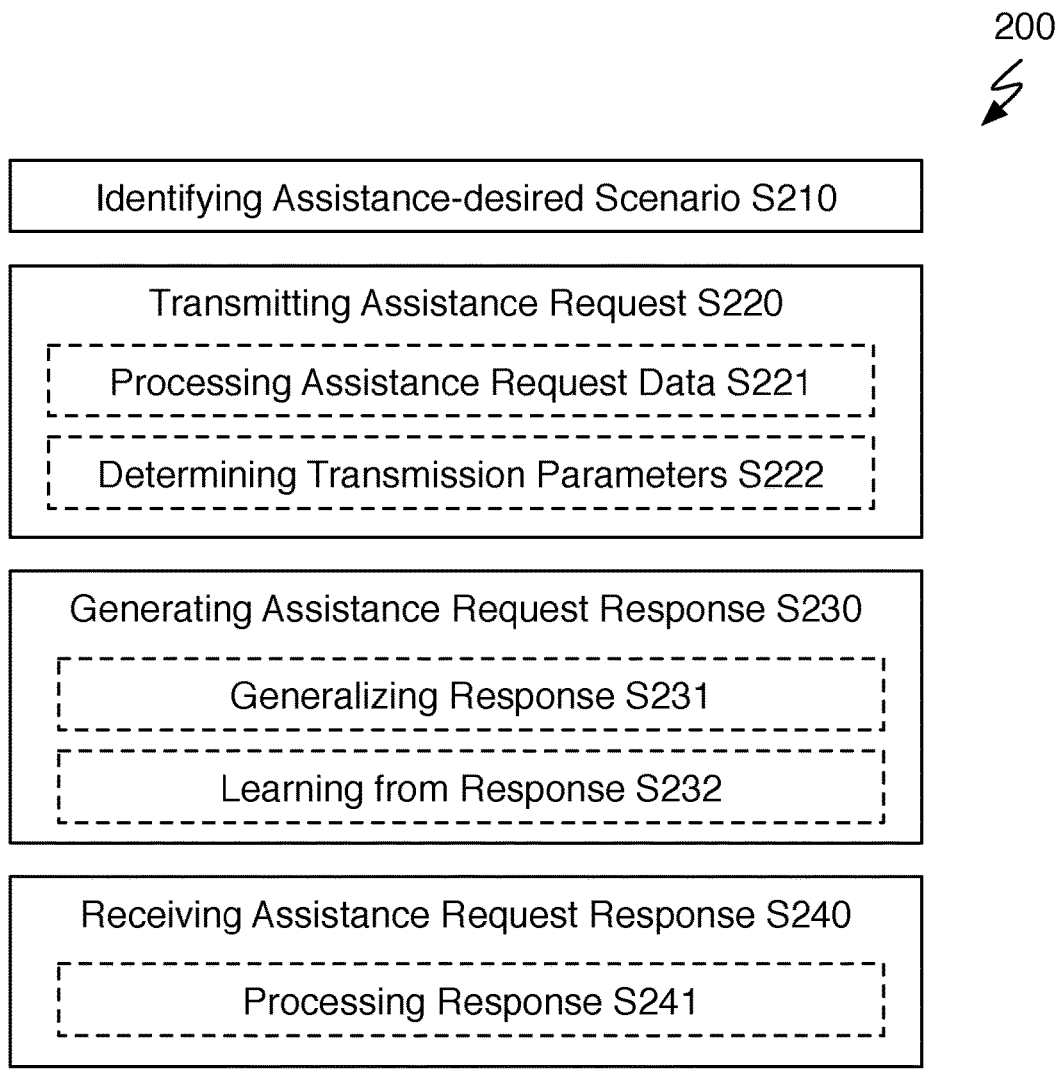
FIG. 3 is a diagram representation of a system of a preferred embodiment.

As shown in FIG. 3, a method 200 for remotely assisting autonomous vehicle operation includes identifying an assistance-desired scenario S210, transmitting an assistance request S220, generating an assistance request response S230, receiving the assistance request response S240, and modifying vehicle operation in response to the assistance request response S250.

The method 200 functions to enable onboard computing systems of autonomous vehicles to identify scenarios in which vehicle operation may be improved and/or made safer by remote assistance, and to efficiently request and receive remote assistance in these scenarios. Accordingly the method 200 functions to enable an expert mode from a non-expert mode, where in the expert mode an autonomous vehicle requires assistance for negotiating an assistance-desired scenario. The method 200 requires the onboard computing systems to actively observe the environments external to the autonomous vehicle and internal to the autonomous vehicle for identifying scenarios in which the autonomous vehicle may require assistance.

The method 200 is preferably operable on the remote assistance system 100, but may additionally or alternatively operate on any suitable system for remotely assisting autonomous vehicles.

S210 includes identifying an assistance-desired scenario. S210 functions to identify a scenario in which an onboard computing system of an autonomous vehicle may improve vehicle operation and/or safety by augmenting the onboard intelligence using remote assistance. S210 may additionally or alternatively be used to identify a scenario in which interaction between an autonomous vehicle and another entity (e.g., a vehicle occupant, a pedestrian, authorities) and/or the environment may be improved and/or made safer.

Some example scenarios in which remote assistance may be desired include scenarios in which autonomous vehicle sensing is impaired (e.g., due to sensor failure, environment, or other causes), scenarios in which autonomous vehicle operation is impaired (e.g., a flat tire, engine problems, control interface issues), scenarios in which autonomous vehicle decision-making confidence is low (e.g., unrecognized objects in the road, a vehicle or pedestrian behaving erratically, objects blocking a path of the autonomous vehicle), and scenarios in which interaction is otherwise desired with environment or other entities (e.g., inclement weather, environmental event, a passenger or pedestrian is in need of medical assistance, a vehicle is occupied by an unauthenticated individual, an item has been left in a vehicle by a previous occupant). Remote assistance may also be requested by an occupant of the autonomous vehicle and generally, without an intervention by the onboard computing system.

In some cases, assistance-desired scenarios may be identified as scenarios where the negative consequences of waiting for an autonomous vehicle decision are greater than consequences of delay incurred by remote assistance. In another case, assistance-desired scenarios may be identified as scenario in which multiple attributes of a scenarios are not readily identifiable or computable by the autonomous vehicle.

S210 preferably includes identifying an assistance-desired scenario by monitoring an assistance desire score. The assistance desire score is preferably generated based upon the current state of the autonomous vehicle, but may additionally or alternatively be generated based on past or predicted future vehicle states, and/or past/current/predicted environmental states as well. The assistance desire score is preferably generated by assigning weights to various assistance desire criteria and creating a weighted sum of matched assistance desire criteria. The score is then compared against an assistance threshold; if the threshold is exceeded, a scenario is identified as an "assistance-desired" scenario. This enables certain assistance desire criteria to immediately result in an assistance request (e.g., the assistance desire score threshold is 1, and LIDAR failure results in a score contribution of 1, resulting in immediate identification of a scenario as 'assistance-desired') while other assistance desire criteria may result in an assistance request only if met along with other criteria.

Additionally, and/or alternatively, S210 includes identifying an assistance-desired scenario by observing one or more of an internal environment (e.g., inside the autonomous vehicle), external environment (e.g., outside of the autonomous vehicle), and the operations of the systems of the autonomous vehicle, itself. S210 would then identify one or more attributes of the observations and comparing the identified attributes to one or more predetermined lists and/or an assistance-desired database. In such circumstances, if the one or more attributes matches or substantially matches an assistance-requiring scenario in the predetermined lists and/or within the assistance-desired database, S210 identifies the scenario as an assistance-desired scenario.

The one or more predetermined assistance scenario lists and/or assistance-desired database include predetermined or known scenarios in which remote assistance to the autonomous vehicle is most likely required. The predetermined assistance scenario lists and/or the assistance-desired database may be continually updated to include newly identified assistance-desired scenarios, such as those obtained from occurrences involving autonomous vehicles operating in the field and/or determined in scenario processing by an artificially-intelligent expert.

In some embodiments, the comparison of attributes of sensed data to predetermined lists and/or an assistance-desired scenario may be performed in combination with, prior to, and/or after a determination of an assistance-desired scenario based on an assistance desire score. For instance, in the case that the attributes of the aggregated sensed data fail to match any items in the predetermined list and/or assistance-required database, S230 may subsequently process the aggregated sensed data to identify an assistance desire score and compare the score against the assistance-desired threshold. The reverse order can also be implemented for determining an assistance-required scenario. Thus, while the autonomous vehicle may fail to identify an assistance-desired scenario at a first instances of processing the sensed data, it is possible that in the second processing of the sensed data that an assistance-desired scenario is identified using the same sensed data. A technical advantage of using a two-prong assistance-desired scenario analysis is that the autonomous vehicle's onboard decisioning regarding whether or not a particular scenario constitutes an assistance-desired scenario is significantly improved thereby improving vehicle operability and safety.

For example, if an autonomous vehicle is driving through a construction zone (as detected by machine vision systems of the autonomous vehicle), resulting in an assistance-desire score contribution of 0.6 (failing to pass the threshold). Then, in the construction zone, low horizontal clearance is detected in the path of the vehicle (i.e., the vehicle needs to squeeze through a narrow gap), resulting in assistance desire score contribution of 0.5, which crosses the threshold and identifies the scenario as 'assistance-desired'.

Additionally, and/or alternatively, S210 is able to weight varying aspects of scenarios observable and/or involving an autonomous vehicle based on perceived level of safety of a scenario and also, perceived level of exposure of the autonomous vehicle to inoperability. For instance, when it is determined by the autonomous vehicle that a perceived safety of a passenger is low due to an external threat (e.g., unauthorized attempt to enter the autonomous vehicle or the like), the autonomous vehicle may assign a very high weight or assistance-desired value, such as 0.8, to this scenario. In another example, when it is determined by the autonomous vehicle perceived level of exposure of the autonomous vehicle to inoperability is high due to a scenario in which environmental conditions may cause flooding or the like to an engine and/or systems of the autonomous vehicle, the autonomous vehicle may prescribe a very high weight (e.g., 0.9) or assistance-desired score or value to this scenario.

S210 may alternatively include generating multiple assistance-desired scores for circumstances observable by an autonomous vehicle. For example, there may be a systems-failure score (e.g., LIDAR failure results in '1', windshield wiper failure results in '0.2') and an environment score (e.g., construction zone results in '0.6', snowing results in '0.2') among other scores. In this implementation, unrelated assistance criteria may not jointly contribute to a single threshold (e.g., if the systems-failure score is at 0.6 and the environment score is at 0.5, the threshold of 1 is still uncrossed because these type of assistance-desired scores are not aggregated but considered independent from each other, whereas in the 'single score' implementation the two scores would have been summed together and crossed the threshold of '1').

Alternatively, S210 may include identifying an assistance-desired scenario in any manner. For example, S210 may simply include checking a list of assistance-desired triggers. The list of assistance-desired triggers preferably includes a predetermined or dynamic list of known assistance-requiring scenarios that once identified by the autonomous vehicle automatically trigger or cause the implementation of a process for obtaining assistance to the autonomous vehicle. S210 may also, as previously mentioned, include receiving a manually-identified assistance-desired scenario (e.g., via manual user input). As another example, S210 may include crossing a geo-fence or otherwise entering an area where a service coupled to the autonomous vehicle has designated the area as an area in which remote assistance is desired for at least some vehicles within the area. Likewise, S210 may include encountering any type of scenario tagged as a scenario for which assistance should be requested; e.g., an autonomous vehicle detects a weapon or dangerous item in the hands of a pedestrian (and this has been previously tagged as a scenario triggering an assistance request).

Additionally, and/or alternatively, S210 may identify an assistance-desired scenario based on a computing comprehension state of the autonomous vehicle. The computing comprehension stat of the vehicle may either be low or high. For instance, when the comprehension state of the vehicle is high comprehension state indicates that a current scenario of the vehicle is one that is readily comprehensible. The high comprehension state of the autonomous vehicle is preferably based on the vehicles ability to comprehend a majority (e.g., greater than 50% or 75-100%) of the variables in and/or actions occurring in a scenario. In a low comprehension state of the autonomous vehicle, the autonomous vehicle has difficulty identifying a majority of the variables in and/or actions occurring in a scenario. Similarly, the low comprehension state can be determined if the autonomous vehicle cannot determine a minority of the variable in and/or actions occurring in a scenario. Accordingly, when the autonomous vehicle has entered a low comprehension state, as determined by the onboard computer 110 or the like, an assistance request may automatically be generated and transmitted to a remote assistance interface. For example, if there are five variables (e.g., objects) in a scenario and the autonomous vehicle cannot interpret, comprehend, or otherwise identify three of the variables in the scenario, this would mean that the vehicles level of comprehension is at 40% and if the minimum comprehension level is 50%, the onboard computer of the autonomous vehicle would enter a state of low comprehension and consequently identify the scenario as an assistance-desired scenario. The thresholds for determining the low and high comprehension states may be adjusted and should not necessarily be limited to greater than or less than 50%.

S210 may additionally or alternatively include receiving notification from an external source (e.g., another autonomous vehicle, or a remote assistance platform) that the autonomous vehicle is in or may soon be in or entering an assistance-desired scenario. For example, the vehicle may approach a construction zone that another autonomous vehicle, also coupled to the remote assistance platform, previously requested assistance while in. As the vehicle approaches this zone, the remote assistance platform may notify the vehicle to prepare for remote assistance (or prompt the vehicle to request remote assistance automatically).

S210 preferably includes identifying assistance-desired scenarios using vehicle sensor data (e.g., LIDAR data, computer vision system image data, speedometer data, engine sensor data), but may additionally or alternatively identify assistance-desired scenarios using any suitable data and/or any suitable data source (e.g., weather data received from a remote source, police scanner data, user input data, data from another autonomous vehicle, etc.). For example, an occupant of an autonomous vehicle may request the vehicle to drive into the middle of a lake. By comparing the vehicle destination to map data (and determining that the endpoint is indeed a lake) an assistance-desired scenario may result. Vehicle sensor data may include any data of any sensor coupled to or in communication with an onboard computer of the autonomous vehicle; e.g., seat weight sensors (traditionally used to activate or deactivate airbags) and internal cameras (directed at the vehicle cabin/occupants).

S220 includes transmitting an assistance request. S220 functions to generate and transmit a request for assistance from an autonomous vehicle to another party, typically a remote assistance platform. The other party of S220 may additionally or alternatively be another autonomous vehicle or any other party capable of providing assistance to the autonomous vehicle. Note that if an assistance-desired scenario is identified by the potential source of assistance, S220 may be optional; i.e., if a remote assistance platform is aware that a vehicle needs remote assistance without an explicit request, that explicit request may be unnecessary.

The assistance request generated and transmitted in S220 preferably includes a set of assistance data to enable an intelligent response to the assistance request. Additionally or alternatively, the assistance request may include a means to access assistance data; e.g., a link enabling a remote assistor to access the machine vision system of the autonomous vehicle. The means can include instructions prepared by the autonomous vehicle indicating a location or source for accessing the assistance data.

Likewise, while assistance data may be transmitted with the assistance request, it may also be transmitted at any time before or after the assistance request. For instance, in some cases, the autonomous vehicle may be aware of an upcoming and/or potential scenario for which assistance will most likely be required. In such case, the autonomous vehicle may send assistance data (pre-assistance data) in advance of the occurrence of the scenario in which an assistance request may be necessary. In this way, the pre-assistance data may be evaluated at the human expert interface 120 and/or the AI expert 140 prior and/or during the scenario in which assistance would be required thereby providing an opportunity for the human expert interface 120 and/or the AI expert 140 to provide preventative assistance in advance of the scenario and/or prepare an assistance response in advance such that the assistance response may be dispatch upon occurrence of the assistance-required scenario.

Assistance data may include raw sensor data (e.g., live-stream or still images) of a camera of the autonomous vehicle, auditory data from microphones of the autonomous vehicle, a and the like), processed sensor data (e.g., a camera view overlaid with object identification indicators placed by the autonomous vehicle's on-board computer, predicted vehicle trajectory, three-dimensional renderings of the autonomous vehicle's environment), autonomous vehicle analysis (e.g., a text description, generated by the autonomous vehicle, of a scene imaged by a machine vision system), historical behavior of the autonomous vehicle, planned future (or proposed) behavior of the autonomous vehicle, autonomous vehicle state, environment state, passenger state, or any other data.

In some embodiments, S220 may be able to capture spatial location attributes of various and/or all objects in a scenario using one or more depth sensors operating on an autonomous vehicle. Accordingly, S220 would obtain depth sensing data from each of the plurality of cameras of the vehicle thereby allowing a three-dimensional rendering of the surroundings of the autonomous vehicle to be generated. In this way, S220 is able to include in the assistance data depth sensing information so that the remote assistance interface (e.g., remote human expert interface 120) is able to render a three-dimensional rendering of the scenario and/or environment of the vehicle.

Additionally, and/or alternatively, the autonomous vehicle using the onboard computer 110 may first generate three-dimensional rendering of its surroundings using the depth sensing information together with the video and still images captured by the sensors of the autonomous vehicle and subsequently, transmit the three-dimensional rendering to the remote assistance interface.

S220 may additionally include processing assistance request data S221. While some data processing occurs as a function of normal autonomous vehicle operation, S221 functions to process data intended for transmission and/or access by a remote assistance platform; e.g., in order to make that data more meaningful or accessible. Thus, S221 functions to initiate an additional and/or alternative data processing (e.g., ulterior data processing) different from normal processing operations of the autonomous vehicle. S221 may include modifying, parsing, and/or culling assistance request data; for example, S221 may include dropping (e.g., deleting) and/or skipping video frames that are substantially similar to previous frames in order to save bandwidth in the transmission and only saving the video frames that were not dropped or changing video compression parameters for similar reasons. For instance, S221 functions to increase the compression of the video frames and/or auditory data in circumstances when a large amount of data must be transferred to a remote assistance platform. Alternatively, S221 functions to preserve and/or enhance the video frames and/or auditory data in circumstances in which increased or improved video and/or audio quality is required at a remote assistance platform or interface for providing meaningful assistance to the autonomous vehicle. As another example, S221 may include tagging images with object identifiers as generated by an on-board computing system (e.g., 'car', 'tree', 'unknown', etc.). S221 may additionally or alternatively include packaging data (e.g., linking, organizing) for more efficient consumption by the remote assistance platform.

S221 may additionally or alternatively include generating or packaging proposed solutions for an assistance request. The generated proposed solutions are preferably transmitted contemporaneously (e.g., at a same time, immediately prior to or after) with the transmission of the assistance request. For example, S221 may include generating a set of proposed responses to a particular assistance-desired scenario. As another example, S221 may include packaging a default response to the current scenario with the assistance data, along with a confidence score associated with that response.

In one implementation of a preferred embodiment, S221 functions to generate 'predicted assistance data' from the assistance data; that is, extrapolate at least some or all of the current data to a future point in time. In particular, this may be useful to aid in dealing with latency issues inherent in a remote assistance system. For example, if there is an average latency of 300 ms between an autonomous vehicle and a remote assistance platform, S221 may include generating 'predicted' camera views by warping the camera view according to a predicted position and orientation of the vehicle 300 ms in the future. While such predicted views may be generated in any manner, in one example embodiment predicted views are generated by calculating a predicted position using vehicle speed and heading (dead reckoning) and using a three-dimensional representation of the imaged scene (e.g., via LIDAR or stereo reconstruction) to determine how the image should be warped. Thus, in order to produce such three-dimensional views, the autonomous vehicle also includes depth sensing technology for identifying spatial locations of objections identified in camera views and the like. The predicted assistance data may include any kind of predicted information related to the operation and/or trajectory of the autonomous vehicle. And thus, based on any information observable by the autonomous vehicle, predicted assistance data including vehicle velocity, positioning, trajectory, engine functionality, etc. may also be predicted.

S221 is preferably performed on an onboard computer of the autonomous vehicle, but may alternatively be performed partially or fully on a remote computer system.

As previously described, S220 includes transmitting an assistance request, preferably after generation or contemporaneous with the compilation or production of assistance data. In some cases, when there is more than one transmission method available for transmitting an assistance request, S220 may include determining transmission parameters S222.

S222 functions to determine how an assistance request is transmitted (e.g., using cellular connection, over Bluetooth, mesh network formed by autonomous entities, etc.) and potentially to which assistor an assistance request is directed. For example, S222 may tag an assistance request as "AI expert-needed" or "human-needed"; i.e., assistance is requested specifically from a human remote operator. Alternatively, assistance requests may be routed in any manner; for example, tags generated in S222 may be considered (but not necessarily followed) by an assistance router; as another example, requests may be untagged and assistance routing may be performed entirely by the remote assistance platform (and not by the onboard computer of the autonomous vehicle). S222 may also tag an assistance request in order to identify an assistance request type, which may also help in routing the assistance request to an appropriate assistor. Assistance request types may include weather-related assistance request, a pedestrian-related assistance request, a vehicle operation-related assistance request, and the like. S222 using these assistance request types may tag the assistance request to include one or more of the assistance request types to allow the onboard computer no or a routing assistant to transmit and/or route the assistance request to an appropriate assistor.

In some cases, S222 may include using multiple autonomous vehicles communicatively coupled together as a mesh network (e.g., to transmit an assistance request to nodes of the network or to use the network as a means to reach a remote server, in the case that a long-range communication network, such as a cellular network is not available).

S222 may include sending different sets of assistance data using different transmission methods and/or to different assistors. In such instances, S222 sends the different sets of assistance data according to different transmission method based on how the sets of data are tagged or based on the type of data being transmitted (e.g., audio feed, video feed, still images, etc.). For example, S222 may include transmitting position/orientation data of a vehicle over a low-bandwidth, low-latency connection; while transmitting video data over a higher-bandwidth but higher-latency connection. As another example, S222 may include sending a full data set to a remote assistance platform, while broadcasting an abridged assistance data set to vehicles near the autonomous vehicle (e.g., radio frequency, such as FM radio, over Bluetooth, etc.).

Note that S221 and S222 may be performed in any order. For example, determination of transmission method or destination in S222 may affect how data is processed in S221.

As an example, S222 may include transmitting position/orientation data of a vehicle over a low-bandwidth, low-latency connection; while transmitting video data over a higher-bandwidth but higher-latency connection. Thus, S222 performs decisioning with respect to the transmission mode of varying types of assistance data from an autonomous vehicle. The remote assistance platform may then perform image warping on the video and/or still image data based on the difference in position/orientation data between the latest sample of position/orientation data received and the sample of position/orientation data taken at the time of video frame generation.

S230 includes generating an assistance request response. S230 functions to analyze an assistance request and/or the associated assistance data to create a response to the request that can then be transmitted back to the assistance requestor.

S230 preferably includes analyzing the assistance request according to request generation criteria; that is, if the assistance request was created in response to a particular issue or scenario-type, S230 preferably includes analyzing the assistance request (including any assistance request data) according to the identified issued or scenario type. For instance, scenario types include external scenarios and internal scenarios and within those two main types of scenarios may be sub-scenario types identifying various scenarios that may occur internal and external to the autonomous vehicle. Alternatively, S230 may include analyzing the assistance request in any manner, or not analyzing the assistance request at all. Whether or not, S230 analyzes the assistance request may depend on a complexity of the assistance request.

If a specific destination for an assistance request has not already been determined, S230 may include determining how an assistance request should be routed. For example, S230 may include selecting a human expert from a list of available remote experts to provide assistance, or may include determining whether an assistance request should be routed to a human expert or to an AI expert. The determination of the destination of the assistance request may be based on the complexity of the assistance request. For instance, if the assistance request is highly complex, it is more likely than not that an artificially-intelligent expert may not be able to resolve or provide an effective response to the assistance request. Thus, in such circumstance, S230 may route a complex assistance request to a human expert. Similarly, S230 may route less complex assistance request to an artificially-intelligent expert, which may be predetermined responses to a less complex assistance request. Of course, the complexity of an assistance request may be determined based on a number of analyze attributes and factors relating to the scenario giving rise to the assistance request. For instance, when there are a great number of unknown variables and/or assistance-desired scores for several variables are high, S230 may determine the scenario to be highly complex. Conversely, if the number of unknown variables is small and/or assistance desired scores are relatively low, then S230 may determine the scenario to be of low complexity.

As another example, S230 may include sending a request for assistance to multiple experts simultaneously. In such example, S230 sends the request to multiple experts to identify a collective response to a scenario or possibly to obtain a faster response to the assistance request.

S230 may include generating assistance request responses in any manner. For example, S230 may include confirming a proposed action transmitted with an assistance request, or may include selecting a proposed action from a list of proposed actions or selecting a proposed action from a list of proposed actions and modifying the selected action. S230 may additionally or alternatively include generating or receiving instructions for an autonomous vehicle. For example, S230 may include directing a car to park in a certain location, or to drive around an object. S230 may additionally or alternatively include accepting remote control of the autonomous vehicle (this could also be viewed as 'receiving instructions', but it is worth noting that remote control may result in partial or full bypass of an autonomous vehicle's onboard decision making process, as opposed to relying on it to carry out a set of instructions). As another example, S230 may include receiving modifications to or limitations autonomous behavior; for example, a vehicle may receive a modified top speed, or directions to drive only on surface streets (as opposed to highways).

In one example, S230 includes rendering (e.g., two-dimensional or three-dimensional rendering or displaying a top-down (or other plan view) of an autonomous vehicle and its surroundings and allowing an expert to indicate a route or course of action that an autonomous vehicle should follow to avoid an obstacle (or otherwise respond to a situation) or to otherwise, negotiation an assistance-required scenario. An expert may, for example, draw a route on top of this view, which then an autonomous vehicle may follow or attempt to follow. The drawing or schematic by the expert may also be transmitted to the autonomous vehicle for processing at the onboard computing system therein. At the autonomous vehicle, the drawing or schematic may be converted into routing and/or driving instructions (e.g., computer-executable instructions or code) for the autonomous vehicle to execute or follow and/or also converted into formal route information having an enhance route drawing similar to those typically displayed on a global positioning system (GPS) display. It may be advantageous to convey instructions in one or more of these manners as, unlike in true manual control, control interface level decisions (e.g., acceleration, wheel position) are determined by the autonomous vehicle locally (and thus are not subject to the latency penalty incurred by true remote control).

Additionally, and/or alternatively, the human expert interface may provide a display showing a top-down view along with a second live view or real view of the surroundings of the autonomous vehicle. In this case, while the expert using the top-down schematic of the autonomous vehicle and surroundings to draw a route, the route being drawn on the top-down view may be automatically superimposed (simultaneously or near simultaneously) or drawn on the live or real view of the surroundings of the vehicle. In this way, the human expert is able to view an estimated location of the route lines in the live or real view that were drawn in the top-down view. Accordingly, the human expert could also work reversely by drawing on the live or real view so that the lines drawn on the live or real view would be drawn onto the top-down view schematic. This may allow for additional accuracy in preparing a proposed routing for responding to an assistance request since the lines may be drawn exactly where they are necessary in the live or real view and automatically and accurately drawn to the top-down view schematic which is typically sent to the autonomous vehicle for processing.

In another example, S230 includes identifying other vehicles to an expert and enabling the expert (human or AI) to designate a vehicle to follow. For example, an expert may note that a vehicle in front of the autonomous vehicle is currently navigating an obstacle; the remote assistance platform may track the path taken and attempt to route the autonomous vehicle along the same or a similar path while factoring in or considering similarities and differences of the vehicle and any changing attributes of the environment.

In some implementations of a preferred embodiment, S230 may include generalizing the assistance request response S231. S231 functions to take a response to a given assistance request and transform the response into a response to be automatically implemented; e.g., by an autonomous vehicle on-board computer (potentially in lieu of requesting assistance) or by an AI expert. S231 may additionally or alternatively include generating a generalized response to be suggested to a remote human expert when encountering a similar scenario to the one for which the assistance request was generated.

For example, a first autonomous vehicle encounters a construction zone with narrow horizontal or width-wise clearance. Expert assistance is requested, and a human expert takes remote control of the vehicle and guides it through the construction zone. From the expert response (e.g., how the vehicle was controlled), a vehicle path is generated as a part of S231. Now, when the next autonomous vehicle enters the same construction zone, the next autonomous vehicle may attempt to use (or may check the viability of using) the path generated by S231 instead of again requiring a human expert to guide the vehicle through the construction zone.

S231 preferably includes storing at least some data describing the assistance-desired scenario (so that it may be found and compared to future scenarios) as well as some data describing a response. The response data may be processed in any manner; e.g., as described, remote control instruction may be generalized or abstracted to a travel path. The stored description of the assistance-desired scenario may be operably linked to or stored together with the response data including any generalized or abstracted instructions to the autonomous vehicle.

S231 may include fleet-wide propagation of an assistance-desired scenario and/or a response to the assistance request associated with the assistance desired scenario. In such instance, if the assistance-desired scenario is tagged as a potentially highly occurring scenario, then the onboard computer system of all other autonomous vehicles in a fleet of autonomous vehicle may be updated to include the assistance-desired scenario and response to the assistance request. In another instance, S231 may disseminate the assistance-desired scenario together with the response for successfully negotiating the scenario in real-time (e.g., within seconds, 2-59 seconds) or near real-time (within minutes, 1-15 minutes) to nearby autonomous vehicles, autonomous vehicles with pending routes in a location affected by the scenario, autonomous vehicles that are in a predetermined vicinity or radius of a location of the scenario and/or the autonomous vehicle initiating the assistance request.

S231 may additionally include storing generalized scenario data in an accessible server (e.g., so autonomous vehicles may fetch data from this server with regularity) or pushing the data to autonomous vehicles (or otherwise broadcasting the data). For example, S231 may store generalized scenario data linked to specific geographic areas or geo-fences, such that when an autonomous vehicle enters one of the specific areas, the generalized scenario data is pushed to the autonomous vehicle.

S232 includes learning from the assistance request response. S232 functions to train future responses of a remote assistance platform given generated request responses; additionally, S232 may also train future responses based on the success of implemented responses. For example, if human experts respond to a class of scenarios in a predictable way, S232 may include training an AI expert to respond in the same manner automatically, or training the human expert interface to suggest a solution in the same manner.

S232 preferably includes modifying a remote assistance platform's response generation mechanisms based on identified scenarios and human expert responses, but may additionally or alternatively include modifying response generation mechanisms based on any suitable data. For example, S230 may include generating a response at an AI expert system; S232 may include evaluating the success of that response and updating the AI expert system accordingly. As another example, S232 may include asking a human expert to identify an object in a scene (potentially unrelated to the request response) and updating autonomous vehicle object classification systems based on the human expert response.

S232 may also include modifying a human expert interface based on a human expert response. For example, S232 may include displaying multiple data interfaces to a human expert, and then attempting to determine which of those data interfaces were relevant to the expert decision making process and which were not (e.g., via eye tracking, via expert surveying, etc.). From this information, S232 may include modifying human expert interfaces (which may be situationally dependent as well) to increase the relevance of displayed information to a human expert.

S240 includes receiving an assistance request response. S240 functions to receive at the autonomous vehicle the response generated in S230. S240 may include receiving the assistance request response (e.g., a set of high-level instructions, manual control, selection of a propose autonomous response) in any manner.

In some implementations of a preferred embodiment, S240 includes processing the assistance request response S241.

S241 may include processing the assistance request response in any manner. For example, S241 may include verifying instructions received via the response against a set of sanity checks (e.g., speed limits, minimum distance thresholds to objects as determined by ultrasound sensors). Sanity, in such circumstances includes, but is not limited to, a set of operational parameters and/or thresholds that may be used to govern the outer limits of operation of the autonomous vehicle. If a response includes instructions that require violation of a vehicle sanity check, S241 may include requesting confirmation of the instructions in any manner. For example, a remote expert may provide instructions that would require a vehicle to violate the speed limit. S241 may include receiving confirmation of these instructions from the remote expert (e.g., explicit confirmation), another remote expert (or several remote experts), a supervisor, and/or authorities.

As a second example, S241 may include converting high-level instructions (e.g., a specified path, instructions to follow a particular vehicle) into control inputs, subject to changing conditions along the path.

As a third example, S241 may include performing control warping in a manner somewhat similar to the manner in which video frames sent to an expert may be predictively warped. In this example, S241 may include receiving control data (e.g., manual driving data) and modifying the control data based on the difference between current sensed data and sensed data used at the time the control data was generated. For instance, an expert turns left to an extent that would result in the vehicle wheels being positioned at a 45 degree angle relative to an intersection, but by the time the vehicle input receives the control data, the vehicle has travelled further through the intersection and the control data would actually result in a 40 degree angle relative to the intersection. S241 may include modifying the control data to end with the same result (the 45 degree angle relative to the intersection)

S241 may also be useful in modifying generalized responses received or proposed for particular situations. For example, a vehicle approaches a construction zone for which a generalized response was generated. As the vehicle approaches, it is prompted that it may need assistance, and is provided with a proposed solution. S241 may include analyzing the scenario for which the generalized response was originally created and comparing that scenario to the current scenario. If the scenario is similar, S241 may include modifying the proposed solution to account for any differences between the current scenario and the response-generation scenario. For example, if a generalized scenario includes a path to drive around an object, and the object in the current scenario has been shifted, S241 may include also shifting the path accordingly.

If the similarity between the current scenario and the generalized scenario does not meet a similarity threshold, the method 200 may include rejecting the proposed solution and/or requesting a new response via the remote assistance platform.

It shall be noted that, in some embodiments, when an autonomous vehicle enters the expert mode in situations when remote assistance from an expert is desired, the drivable speed or velocity of the autonomous vehicle is limited throughout the duration of the expert mode session. Once the expert mode session (e.g., a remote assistance expert has stopped assisting) is terminated, the limitation on the drivable speed or velocity of the autonomous vehicle is lifted.

3. System for Remotely Assisting an Autonomous Vehicle and Implementing Fleet-wide Propagation of Assistance Data As shown in FIG. 3, a system 300 for remotely assisting autonomous vehicle operation and updating operation systems of a fleet of autonomous vehicles is illustrated. System 300 includes a plurality of autonomous vehicles 310, a remote assistance server (e.g., expert mode server) 320, a global server (e.g., fleet server) 330, an artificial intelligence server 340, a video server 350, and a communication network 360. It shall be noted that each of the remote assistance server 320, global server 330, artificial intelligence server 340, and video server 350 may be implemented in a single master server and/or in various combinations of servers. For instance, the global server 330 and the artificial intelligence server 340 may be combined to enable additional processing efficiencies.

Generally, the system 300 functions to enable remote assistance to one or more autonomous vehicles 310 and in some cases, updates some or all of the autonomous vehicles 310 with new operation information to improve the operability thereof and an overall safety of operating the autonomous vehicles 310. The new operation information may be obtained based on one or more interactions (e.g., assistance-desired scenarios) involving the remote assistance server 320 and one or more of the autonomous vehicles 310. For instance, the system 300 through global server 330 would operate to update the operation systems of the autonomous vehicles 310 with assistance-desired resolution data. The assistance-desired resolution data includes any helpful or meaningful data obtained during the resolution of an assistance-desired scenario, which may include a description of the assistance-desired scenario and a response or resolution to the assistance-desired scenario.

A remote assistance subsystem of the system 300 includes the primary components including a computing client (e.g., client code executed by an onboard computer) operating on each autonomous vehicle 310, the remote assistance server 320, and a human expert interface 120 (e.g., a human expert terminal). The remote assistance subsystem optionally includes the artificial intelligence server 340 and AI expert 140.

The computing client functions to aggregated data from the operation systems of the autonomous vehicle information and communicate the aggregated data to the remote assistance server 320 in various circumstances including during an assistance-desired scenario. Additionally, the computing client functions to receive commands from the remote assistance server including commands for controlling one or more operations of the vehicle (e.g., remote driving of the autonomous vehicle).

Upon receipt of the aggregated data from the computing client, the remote assistance server is configured to process some and/or all of the aggregated data and route the processed data to a terminal of the human expert interface 120. The human expert interface 120, via the terminal, would then convert the data from the remote assistance server 320 to display the data in one or more meaningful manners to assist the human expert in resolving an assistance-desired scenario.

The terminal of the human expert interface includes one or more displays and other input and output components useable by the human expert to interact with an autonomous vehicle. In some cases, the terminal includes a primary display in which multiple feeds of disparate data from an autonomous vehicle is presented therein. In some cases, each of the multiple feeds of disparate data originate from a distinct camera of the autonomous vehicle. For instance, in some cases, the autonomous vehicle includes four active cameras with each of the four cameras being configured to capture different views of an external environment of the autonomous vehicle. Thus, each of the multiple feeds of disparate data is used to generate a distinct display of a camera view. It shall be noted the multiple feeds of disparate data may be any type of data including auditory data and the like.

The video server 350 preferably implements a process flow for processing the data being fed from each of the cameras of an autonomous vehicle and then relays the data feed from each of the cameras to the remote assistance server 320 and/or the human expert interface 120. Specifically, the video server 350 at a first step obtains or extracts frames off of one or more framer buffers for the cameras and provides the extracted frames to the machine visioning system. At a next step, a compression algorithm is applied to the frames for compressing the data of the frames into a smaller compressed packets. Preferably, the compression of the frames is performed using the HG64 compression and encoding technique; however, it shall be noted that any suitable compression technique may be used. Once the compressed frame packets are generated, the video server implements a handshaking process to connect the feed from the autonomous vehicle to a terminal of the remote human expert by transmitting the packets via a UDP to the remote assistance server 320, which then sends the compressed frame packets via a web socket connection to the web application of the human expert interface 120, which is then decoded, preferably using HG64. Once the compressed frame packets are decoded, the frame data from each respective camera of an autonomous vehicle may be display in different segments of a single primary display of the human expert terminal. Alternatively, the frame data from each respective camera may be displayed at separate displays of the human expert terminal.

The video server 350 also functions to relay real-time video from the autonomous vehicle. Accordingly, the video server 350 is able to obtain one or live video feeds from one or more cameras of an autonomous vehicle and relay the live feed in real-time to the remote assistance server 320 and/or the remote human expert interface 120.

Accordingly, the primary display at the human expert terminal may be configured to selectively display multiple views from the cameras of the autonomous vehicle. Preferably the primary display of the terminal displays at least three different views from the cameras of the autonomous vehicle, wherein each of the views being displayed at the primary display includes a continuous transmission and/or live transmission of data from a respective camera of the autonomous vehicle. While remotely assisting an autonomous vehicle, the human expert can select from among the multiple views at the primary display in order to make the selected view large and the remaining views small. As a result of the selection by the user of a single view to make large, the human expert interface 120 is able to selectively provide enhanced bandwidth (e.g., high bandwidth or a decreased compression ratio) transmission parameters for the data being transmitted from the specific camera associated with the selected view. Correspondingly, the other views which are not selected are made small or otherwise, maintained as small views in which the human expert interface maintain low bandwidth transmission parameters or an increased compression ratio. Additionally, and/or alternatively, by selecting a single view to be made larger may transmit a signal to the autonomous vehicle to discontinue transmission of the feed from the non-selected cameras. Additionally, the autonomous vehicle may disable the cameras of the non-selected views. A technical benefit of such a configuration is that the human expert interface 120 and the autonomous vehicle are able to conserve bandwidth only for the desired information (e.g., the selected view) while continuing to allow other information (e.g., the unselected views) to continue to transmit and display information albeit in a reduced low bandwidth state. Accordingly, such configuration aids in alleviating bandwidth issues surrounding the transmission of very large amounts of data from the autonomous vehicle.

The global server 330 is operably in communication the fleet of autonomous vehicles 310. The global server 330 is configured to receive update information from a number of sources including the remote assistance server 320. Once the remote assistance server 320 has identified a resolution to an assistance-desired scenario, the remote assistance server 320 compiles or packages data from the assistance-desired scenario together with data from the resolution (e.g., assistance response data) into an update that is propagated fleet-wide to the autonomous vehicles 310. In this way, the operation systems of the updated autonomous vehicles would be equipped to resolve a similar assistance-desired scenario without require intervention by the human expert interface 120 or any remote assistance interface.

As an example, in resolving an assistance-desired scenario, the human expert interface may blacklist a particular lane or section of a previously available path thereby restricting the autonomous vehicle from using the blacklisted lane or path. Thus, any rerouting calculated by the onboard computer 130 or AI expert 140 must be done in light of the blacklist information; meaning, that during rerouting calculating a mapping or routing database will generally indicate a list of lanes, routes, or traveling paths as blacklisted or otherwise, unavailable for traveling by the autonomous vehicle. Accordingly, if the case that the blacklisted path involves an obstruction such as an accident or some other immovable object, such information would be useful to other autonomous vehicles with routes involving the blacklisted path or other autonomous vehicles operating in a vicinity of the blacklisted path. The global server 330 would obtain the blacklist data from the remote assistance server 320 and/or directly from the human expert interface 120 and disseminate the blacklist data to a plurality of the autonomous vehicles 310 thereby causing each of the vehicles to be updated in order to avoid the obstruction and/or accident at the blacklisted lane or path.

The artificial intelligence server 340 may be used in implementing the AI expert 140. Specifically, in an assistance-desired scenario, the artificial intelligence server 340 implementing the AI expert 140 is able to analyze an assistance-desired scenario and associated assistance request data in order to determine one or more proposals or proposed responses for successfully negotiating the assistance-desired scenario. In such cases, the AI expert 140 executes one or more assistance-provisioning algorithms (e.g., rerouting algorithm or the like) while leveraging resources of the artificial intelligence server 340 to generate the one or more proposals. After generating the proposals, the AI expert 140 may then present the one or more proposed responses to the remote assistance server 320 and/or the human expert interface 120 for approval and/or confirmation thereby allowing a reduce cycle time in handling of and/or time of engagement of the human expert of the remote assistance of the autonomous vehicle.

Accordingly, the human expert at the human expert interface 120 is able to evaluate the one or more proposed responses and in response thereto, confirm the proposed response, deny the proposed response, or modify the proposed response by the AI expert 140. For example, if the AI expert 140 determines a proposed rerouting path for an autonomous vehicle with an outstanding assistance request, the human expert at the human expert interface 120 may evaluate the proposed rerouting and choose not to confirm the proposed rerouting but modify the proposed rerouting to change modify a proposed route within the proposed rerouting. In such case, the human expert may find some or many part of the proposed rerouting helpful, but based on human expert intelligence is able to modify the proposed rerouting for further improving, operability of the vehicle, efficiency in the rerouting, and/or safety of the rerouting of the autonomous vehicle.

The communication network 360 may include any type of known communication network including short-range (e.g., radio frequency or Bluetooth), long-range communication (e.g., wireless Internet), and mesh networks.

The method of the preferred embodiment and variations thereof can be embodied and/or implemented at least in part as a machine configured to receive a computer-readable medium storing computer-readable instructions. The instructions are preferably executed by computer-executable components preferably integrated with a remote assistance platform for autonomous vehicles. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

As a person skilled in the art will recognize from the previous detailed description and from the figures and claims, modifications and changes can be made to the preferred embodiments of the invention without departing from the scope of this invention defined in the following claims.

We claim:

1. A system comprising:
   an autonomous vehicle, the autonomous vehicle comprising:
      one or more sensors; and
      an onboard computer that:
         collects sensor data from, at least, the one or more sensors;
         identifies a scenario, from the collected sensor data, requiring remote assistance to the autonomous vehicle; and
         generates an assistance request that identifies the scenario and at least some of the collected sensor data;
         wherein the onboard computer includes an assistance router that is disposed onboard the autonomous vehicle and is configured to automatically route the assistance request of the autonomous vehicle to one or more assistance providers;
   a remote assistance interface that is communicatively coupled to the assistance router of the onboard computer and is configured to:
      receive the assistance request from the autonomous vehicle via the assistance router onboard the autonomous vehicle; and
      provide an assistance response to the assistance request of autonomous vehicle after processing the scenario and the collected sensor data identified in the assistance request.

2. The system of claim 1, wherein:
   the assistance router processes the assistance request and identifies one or more destinations of the assistance request based on one or more attributes of the assistance request, wherein the assistance router routes the assistance request to the one or more destinations selected from the remote assistance interface and an artificially-intelligent (AI) expert, wherein the AI expert is distinct from the onboard computer and remote from the autonomous vehicle, and wherein the remote assistance interface provides artificial-intelligently calculated responses to the assistance request.

3. The system of claim 1, wherein the scenario comprises a situation in which sensing for the autonomous vehicle is impaired.

4. The system of claim 1, wherein the scenario comprises a situation in which decision making for the autonomous vehicle is impaired.

5. The system of claim 1, wherein the scenario comprises a situation in which a routing or path for traversing the scenario would run contrary to one or more traffic rules or norms.

6. A method for remotely assisting an autonomous vehicle, the method comprising:
   at an onboard computer:
      aggregating sensor data from one or more sensors of the autonomous vehicle;
      identifying an assistance-desired scenario, wherein the assistance-desired scenario refers to a scenario in which the onboard computer is able to improve vehicle operation and/or safety by augmenting onboard intelligence of the autonomous vehicle using remote assistance;
      generating an assistance request at least some of the aggregated sensor data;
      transmitting the assistance request to a remote assistance interface that is remote from the autonomous vehicle, via an assistance router that is disposed onboard the autonomous vehicle and is configured to automatically route the assistance request of the autonomous vehicle to one or more assistance providers; and
      receiving and processing a response to the assistance request from the autonomous vehicle via the assistance router onboard the autonomous vehicle, via the remote assistance interface.

7. The method of claim 6, wherein, at the onboard computer, the assistance-desired scenario is identified by identifying an assistance desire score that is based on one or more of a current state of the autonomous vehicle, past or predicted states of the autonomous vehicle, and past, current, or predicted environmental states, and wherein the identified assistance desire score is compared to an assistance desire threshold and if the threshold is exceeded by the assistance desire score, a determination of an assistance-desired scenario is made.

8. The method of claim 6, wherein the aggregated sensor data includes data observed from one or more of an internal environment of the autonomous vehicle, an external environment of the autonomous vehicle, and operations of systems of the autonomous vehicle, and wherein the onboard computer:
   identifies one or more attributes of the aggregated sensor data, and
   compares the identified attributes to one or more predetermined assistance scenario lists or an assistance-desired database having stored thereon a plurality of previously-identified scenarios for which remote assistance is required, and
   when the identified attributes match an item within the one or more predetermined assistance scenario lists or within the assistance-desired database, identifies a scenario of the autonomous vehicle as an assistance-desired scenario.

9. The method of claim 6, wherein the aggregated sensor data is selectively parsed to generated a set of assistance data to thereby enabling an intelligent response at the remote assistance interface to the assistance request, and the method further comprises identifying a transmission method for the assistance data assistance request, wherein a first subset of data of the assistance data is transmitted via a low-bandwidth connection and a second subset of data of the assistance data is transmitted via a high-bandwidth connection.

10. The method of claim 6, wherein the remote assistance interface comprises a remote assistance interface, an artificially-intelligent expert, or a combination of the remote assistance interface and artificially-intelligent expert, and the method further comprises identifying which remote assistance interface to route the transmission of the assistance request by selecting among a remote assistance interface and an artificially-intelligent expert interface.

11. The method of claim 6, wherein the aggregated data is processed to generate assistance data to be provided together with the assistance request, wherein the assistance data comprises video image data captured by one or more image capturing devices of the autonomous vehicle, and wherein the video image data is processed to drop excess video frames or change compression parameters of the video image data to make the assistance data more suitable for transmission to the remote assistance interface.

12. The method of claim 6, wherein the response to the assistance request includes a blacklisted path or blacklisted lane that prohibits a use of the blacklisted path or blacklisted lane in a current route or a possible router of the autonomous vehicle.

13. The method of claim 6, wherein the assistance request response includes (i) redrawing traffic boundary lines, (ii) generating autonomous vehicle control data based on the redrawn traffic boundary lines, and (iii) transmitting the redrawn boundary lines and autonomous vehicle control data to the autonomous vehicle.

14. The method of claim 6, further comprising:
transforming the response to the assistance request into an automatic response that is automatically implemented via the onboard computer of the autonomous vehicle when a future condition arises that is similar to the scenario that triggered the assistance request.

15. A method for remotely assisting an autonomous vehicle, the method comprising:
at a remote assistance interface that is remote from the autonomous vehicle and coupled to an assistance router that is disposed onboard the autonomous vehicle:
receiving an assistance request from an autonomous vehicle, wherein the assistance request includes assistance request data comprising sensor data obtained by, at least, the autonomous vehicle, the assistance request received from the assistance router and is configured to automatically route the assistance request of the autonomous vehicle to one or more assistance providers;
processing the assistance request data;
generating an assistance request response based on the processed assistance request data; and
transmitting the assistance request response to the autonomous vehicle.

16. The method of claim 15, wherein:
the remote assistance interface comprises a remote assistance interface having a display, and
the display being configured to display a plurality of camera feeds originating from a plurality of cameras at the autonomous vehicle.

17. The method of claim 16, further comprising:
generating, by an artificially-intelligent (AI) expert, a proposed response to the assistance request and transmitting the proposed response to the remote assistance interface,
wherein generating the assistance response includes confirming or modifying, by a human expert operating the remote assistance interface, the proposed response transmitted by the AI expert.

18. The method of claim 16, further comprising:
selecting one of the plurality of camera feeds to enlarge at the display, and
in response to the selection, causing one or more other camera feeds of the plurality of camera feeds to be:
(i) compressed in size,
or
(ii) disabled.

19. The method of claim 15, further comprising:
at the remote assistance interface:
identifying as a blacklisted path or a blacklisted lane, a path or a lane along a current route or a possible route of the autonomous vehicle, and
transmitting to the autonomous vehicle the blacklisted path or the blacklisted lane along with the assistance request response.

20. The method of claim 19, further comprising:
transmitting to a global fleet server the blacklisted path or the blacklisted lane, and
at the global fleet server:
transmitting an update to each of a plurality of autonomous vehicles, wherein the update includes the blacklisted path or the blacklisted lane.

21. The method of claim 15, further comprising:
generating, based on the response to the assistance request for the autonomous vehicle, a generalized response for use by the remote assistance interface for future requests from additional autonomous vehicles when one or more future conditions arise that are similar to the scenario that triggered the assistance request for the autonomous vehicle.

* * * * *